United States Patent [19]

Cunha

[11] Patent Number: 5,762,471
[45] Date of Patent: Jun. 9, 1998

[54] TURBINE STATOR VANE SEGMENTS HAVING LEADING EDGE IMPINGEMENT COOLING CIRCUITS

[75] Inventor: Francisco J. Cunha, Schenectady, N.Y.

[73] Assignee: General Electric Company, Schenectady, N.Y.

[21] Appl. No.: 832,659

[22] Filed: Apr. 4, 1997

[51] Int. Cl.$^6$ ............................................. F01D 9/04
[52] U.S. Cl. ............................................. 415/115
[58] Field of Search ........................... 415/115, 116; 416/96 R, 96 A

[56] References Cited

U.S. PATENT DOCUMENTS

| | | |
|---|---|---|
| 4,257,734 | 3/1981 | Guy et al. ............................. 415/115 |
| 5,253,976 | 10/1993 | Cunha . |
| 5,259,730 | 11/1993 | Damlis et al. ......................... 416/96 A |
| 5,320,483 | 6/1994 | Cunha et al. . |
| 5,320,485 | 6/1994 | Bourguignon et al. ................. 415/115 |
| 5,340,274 | 8/1994 | Cunha . |
| 5,591,002 | 1/1997 | Cunha et al. . |
| 5,611,662 | 3/1997 | Cunha . |
| 5,634,766 | 6/1997 | Cunha et al. ......................... 415/115 |

*Primary Examiner*—John T. Kwon
*Attorney, Agent, or Firm*—Nixon & Vanderhye

[57] ABSTRACT

Each nozzle vane of a turbine includes a leading edge cavity having an insert spaced from interior wall surfaces of the vane. The insert includes impingement holes for flowing cooling medium from within the insert through the holes for impingement cooling of the vane walls. The insert has a divider dividing the insert into first and second chambers. Cooling medium is supplied directly from a source to the first chamber for impingement cooling of the adjacent vane wall surfaces. Cooling medium at a substantially reduced pressure resulting from impingement cooling of the outer wall of the nozzle segment is supplied to the second chamber. The pressure of the cooling medium supplied the second chamber establishes the pressure difference between the interior and the exterior of the insert thereby affording increased cooling intensity of the impingement cooling flow.

11 Claims, 3 Drawing Sheets

TURBINE STATOR VANE SEGMENTS HAVING LEADING EDGE IMPINGEMENT COOLING CIRCUITS

TECHNICAL FIELD

The present invention relates generally to gas turbines, for example, for electrical power generation, and particularly to cooling circuits for the leading edges of the nozzle stages of land-based turbines.

BACKGROUND

The traditional approach for cooling turbine blades and nozzles is to extract high pressure cooling air from a source, for example, by extracting air from the intermediate and last stages of the turbine compressor. A series of internal flow passages are typically used to achieve the desired mass flow objectives for cooling the turbine blades. In contrast, external piping is used to supply air to the nozzles with air film cooling typically being used. However, the diverted coolant air does not receive energy directly from the combustors of the turbine and represents a parasitic loss to turbine output and degrades overall performance.

In advanced gas turbine designs for land-based turbines, it has been recognized that the temperature of the hot gas flowing past the turbine components could be higher than the melting temperature of the metal. It is therefore necessary to establish a cooling scheme to protect the hot gas path components during operation. Using closed circuit steam to cool gas turbine nozzles (stator vanes) has been demonstrated to be a preferred cooling media, particularly for combined-cycle plants. See, for example, U.S. Pat. No. 5,253,976 and co-pending application Ser. No. 414,697 of common assignee herewith. Because steam has a higher heat capacity than the combustion gas, it is inefficient to allow the coolant steam to mix with the hot gas stream. Consequently, it is desirable to maintain cooling steam inside the hot gas path components in a closed circuit.

In co-pending application Ser. No. 414,697, filed Mar. 31, 1995, of common assignee herewith, there is disclosed a combined air and steam cooling circuit for various nozzle stages of a gas turbine. In the cooling scheme disclosed in that patent application, the nozzles are divided into a plurality of cavities extending the radial length of the vanes and spaced from one another from the leading edge to the trailing edge. While the trailing edge cavity employed air cooling and which coolant air exited the cavity to combine with the hot gas stream, the remaining cavities employed closed-circuit impingement cooling using steam as the cooling medium. In particular, inserts are disposed in each of the cavities and spaced from the interior walls to define cooling channels. Each insert has a plurality of small-diameter holes or apertures whereby the cooling medium, e.g., steam, supplied to the interior of the insert flows through the holes for impingement along the inner wall surfaces of the stator vane. This impingement flow cools the inner wall surfaces of the stator vane and the spent cooling medium flows along channels between the insert and the inner wall surfaces of the vane toward the rear of the insert, where it combines with other spent cooling medium for flow radially inwardly toward the inner wall. By providing discrete flowpaths spaced radially from one another along the length of the vane in each cavity, the spent cooling medium does not degrade the effectiveness of the impingement cooling.

The spacing of the holes is generally between 4–7 hole diameters and the relative location of the insert from the wall is between 2–3 hole diameters. It will be appreciated that the flow of the cooling medium through the impingement holes causes a pressure drop on the order of 3 to 4 psia. It will also be appreciated that the pressure level inside the insert and the pressure level external to the insert in the cooling channels establishes a certain cooling intensity or cooling limit for the impingement jets through the insert holes. The higher the pressure difference between the inside of the insert and the cooling volume between the insert and the interior walls of the vane, the higher the momentum associated with the impingement jets and, therefore, the higher the cooling rate. However, it has been discovered that a limit on the cooling rate is reached at only a 3 to 4 psia pressure difference and that such limitation is not sufficient to cool the nozzle walls for advanced gas turbine applications, particularly in the area of the leading edge of the nozzle.

DISCLOSURE OF THE INVENTION

In accordance with the present invention, there is provided apparatus and methods for controlling, e.g., increasing the differential pressure between the inside and outside of the insert so that higher pressure differentials can be achieved and, hence, greater cooling intensity. It will be appreciated that the pressure of the cooling medium supplied to the interior of the insert is typically fixed by other aspects of the gas turbine cycle and such cooling medium is extracted, such as the steam exhaust of high or intermediate pressure steam turbines. It will also be appreciated that the channels on the external sides of the inserts where the impingement jets discharge constitute the sink side for pressure control. By reducing the pressure on the sink side of the insert in the manner to be described and supplying cooling medium at high pressure to the interior of the insert, a substantially increased pressure differential is achieved between the cooling medium supply side and the sink side and, hence, greater cooling intensity resulting from the impingement jets.

To accomplish this, the insert is divided into two chambers, a first chamber extending generally radially along the leading edge of the insert and between the outer and inner walls of the segment and a second chamber behind the first chamber and also extending generally radially between the outer and inner walls and having opposite side walls in opposition to side walls of the stator vane. Two different pressure streams are supplied to the first and second chambers, respectively. The first cooling medium stream is preferably supplied directly from the cooling medium supply, e.g., a high or intermediate pressure steam turbine. The cooling medium supplied from the same high or intermediate pressure steam turbine to the second chamber, however, flows into a closed plenum defined by an outer side wall cover and an impingement plate forming part of the outer wall of the segment supporting the nozzle. The outer wall is thus impingement-cooled by the cooling medium flowing through the impingement holes of the impingement plate and defines with the impingement plate a second plenum for conveying the spent outer wall impingement cooling medium to the inlet of the second channel of the insert.

As will be appreciated, there is considerable pressure loss associated with the flow of the cooling medium through the impingement holes of the outer impingement plate along the outer wall of the segment. That pressure loss, along with other losses, provide a substantial pressure difference between the cooling medium flows into the first and second channels, respectively, of the insert. Pressure differentials as high as 25 psia can be achieved in this design. Accordingly, higher pressure flows of cooling medium are provided through the impingement openings in communication with the first channel for direct impingement cooling of the inner wall of the leading edge of the stator vane, while simultaneously cooling medium at a reduced pressure flows through the impingement holes in the insert wall of the second channel for impingement cooling of the interior walls of the sides of the vane. As a consequence, the sink pressure between the insert and the walls of the stator vane is controlled by the pressure of the flow into the second channel enabling substantially increased pressure differential across the insert and resulting increased cooling intensity. The flows combine in the flowpaths spaced radially from one another along the vane for flow to a spent cooling medium channel external to the insert and eventually for flow to an inner wall plenum.

In a preferred embodiment according to the present invention, there is provided a stator vane segment for forming part of a stage of a rotary machine, comprising inner and outer walls spaced from one another, a stator vane extending between the inner and outer walls and having forward, leading and aft trailing edges, the vane including a discrete cavity between the leading and trailing edges and extending lengthwise of the vane adjacent the forward leading edge thereof, interior wall surfaces of the vane in part defining the cavity, an insert sleeve within the cavity for receiving a cooling medium and spaced from the interior wall surfaces of the vane, the sleeve having a plurality of holes therealong for flowing the cooling medium through the sleeve holes into the space between the sleeve and the interior wall surfaces for impingement cooling of the vane along the leading edge thereof, the sleeve having a divider extending at least a portion of the length of the insert and dividing the sleeve into first and second chambers, the insert having first and second inlets to the first and second chambers, respectively, for supplying the cooling medium to the chambers at different pressures.

In a further preferred embodiment according to the present invention, there is provided a method of impingement cooling a leading edge portion of a vane forming part of a stator vane segment of a stage of a turbine wherein the vane extends between inner and outer walls of the segment and has a discrete cavity between the leading and trailing edges and extending lengthwise of the vane adjacent the forward leading edge thereof, comprising the steps of disposing an insert sleeve having impingement cooling holes within the cavity and spaced from interior wall surfaces of the vane, dividing the sleeve into first and second chambers extending generally lengthwise of the sleeve and the cavity and flowing cooling medium at different pressures into the first and second chambers, respectively, with the pressure of the cooling medium in the second chamber being lower than the pressure of the cooling medium in the first chamber whereby the pressure in the space between the interior wall surfaces and the sleeve is controlled by the pressure of the cooling medium supplied the second chamber, enabling a substantial pressure difference across the insert for intensified impingement cooling.

Accordingly, it is a primary object of the present invention to provide novel and improved apparatus and methods for cooling the leading edges of nozzle vanes.

BEST MODE FOR CARRYING OUT THE INVENTION

Figure 1:
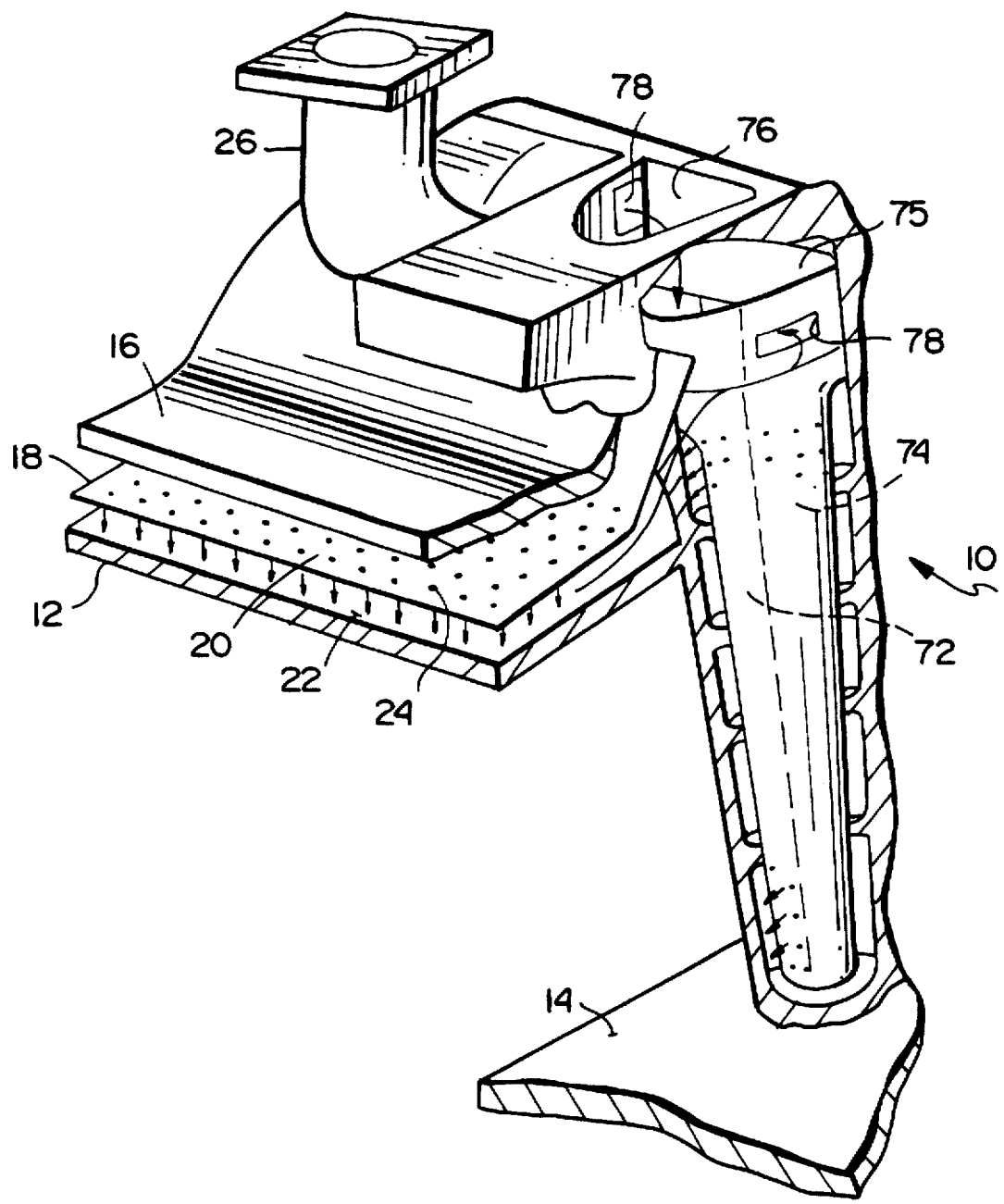
FIG. 1 is a fragmentary perspective view with parts in cross-section illustrating a cooling circuit for the leading edge of a nozzle vane segment forming a part of a turbine segment.

Referring now to the drawings, particularly to FIG. 1, there is illustrated a leading edge portion of a nozzle or stator vane, generally designated 10. Nozzle 10 may comprise any one of a plurality of circumferentially spaced nozzles of a stage of a turbine. Nozzles 10 form part of circumferentially arranged segments connected one to the other to form an annular array of segments defining the hot gas path through the nozzles of each stage. Each nozzle segment includes radially spaced outer and inner walls 12 and 14, respectively, with one or more of the nozzle vanes 10 extending generally radially between the outer and inner walls.

In the illustrated form, the segment includes an outer wall cover 16 spaced from the outer wall 12 of the segment which, in part, defines the hot gas path. An impingement plate 18 is disposed between the cover 16 and outer wall 12 defining outer and inner plenums 20 and 22 on opposite sides of the impingement plate 18. The inner wall 14 is constructed similarly for impingement cooling utilizing the spent impingement cooling medium supplied thereto as described hereafter. The inner wall 14 may be constructed similarly as described and illustrated in the above-identified co-pending application Ser. No. 414,697, the disclosure of which is incorporated herein by reference. It will be appreciated that the impingement plate 18 has a plurality of holes 24 therethrough for flowing a cooling medium from the outer plenum 20 through the holes 24 to the inner plenum 22 for impingement cooling of the outer wall 12. A cooling medium supply pipe 26 is provided each segment and supplies cooling medium from a source, such as the steam exhaust of a high or intermediate pressure steam turbine to the outer plenum 20.

Figure 2:
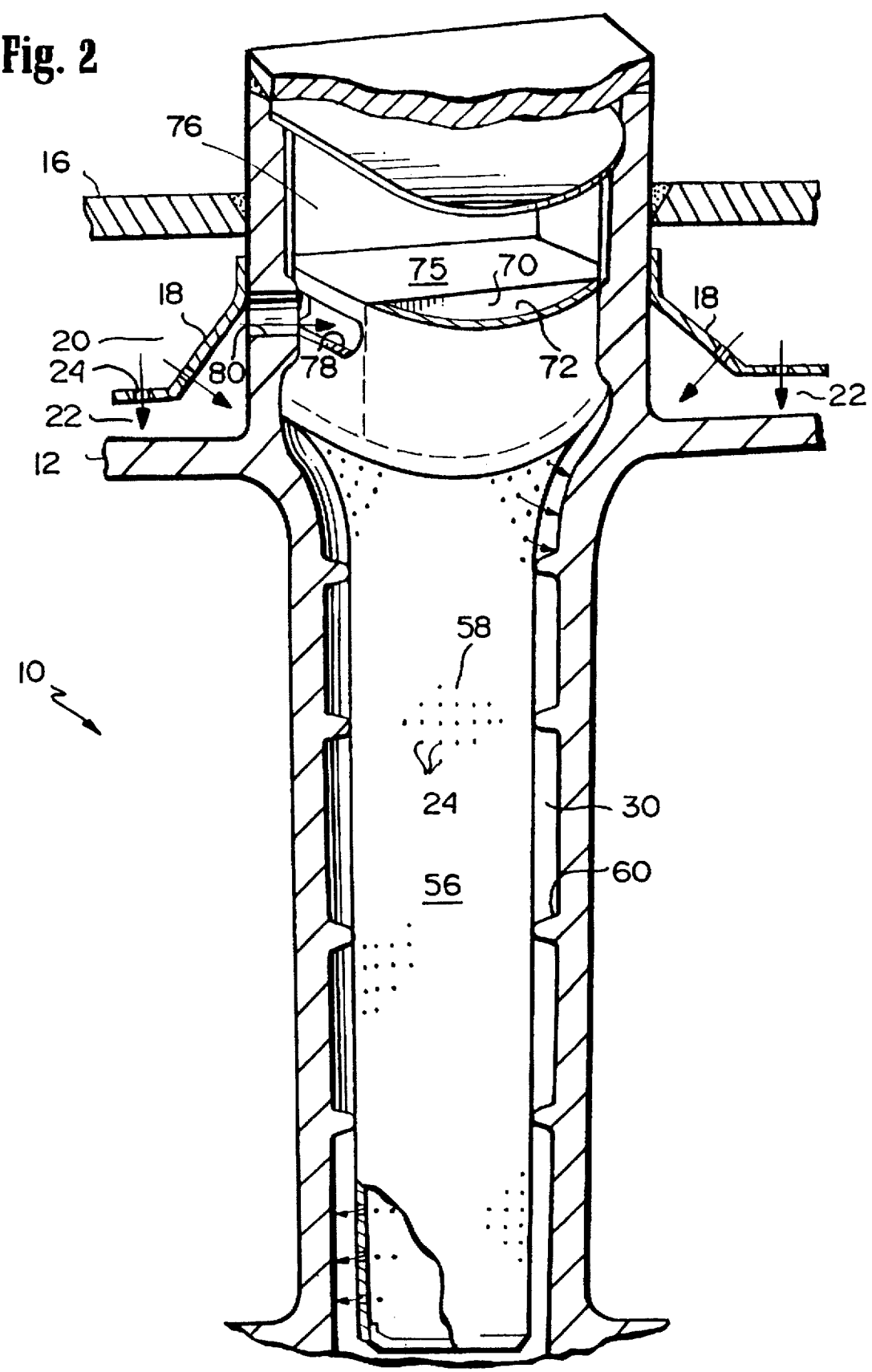
FIG. 2 is an enlarged cross-sectional view thereof illustrating an insert within the leading edge cavity of the vane.
Figure 3:
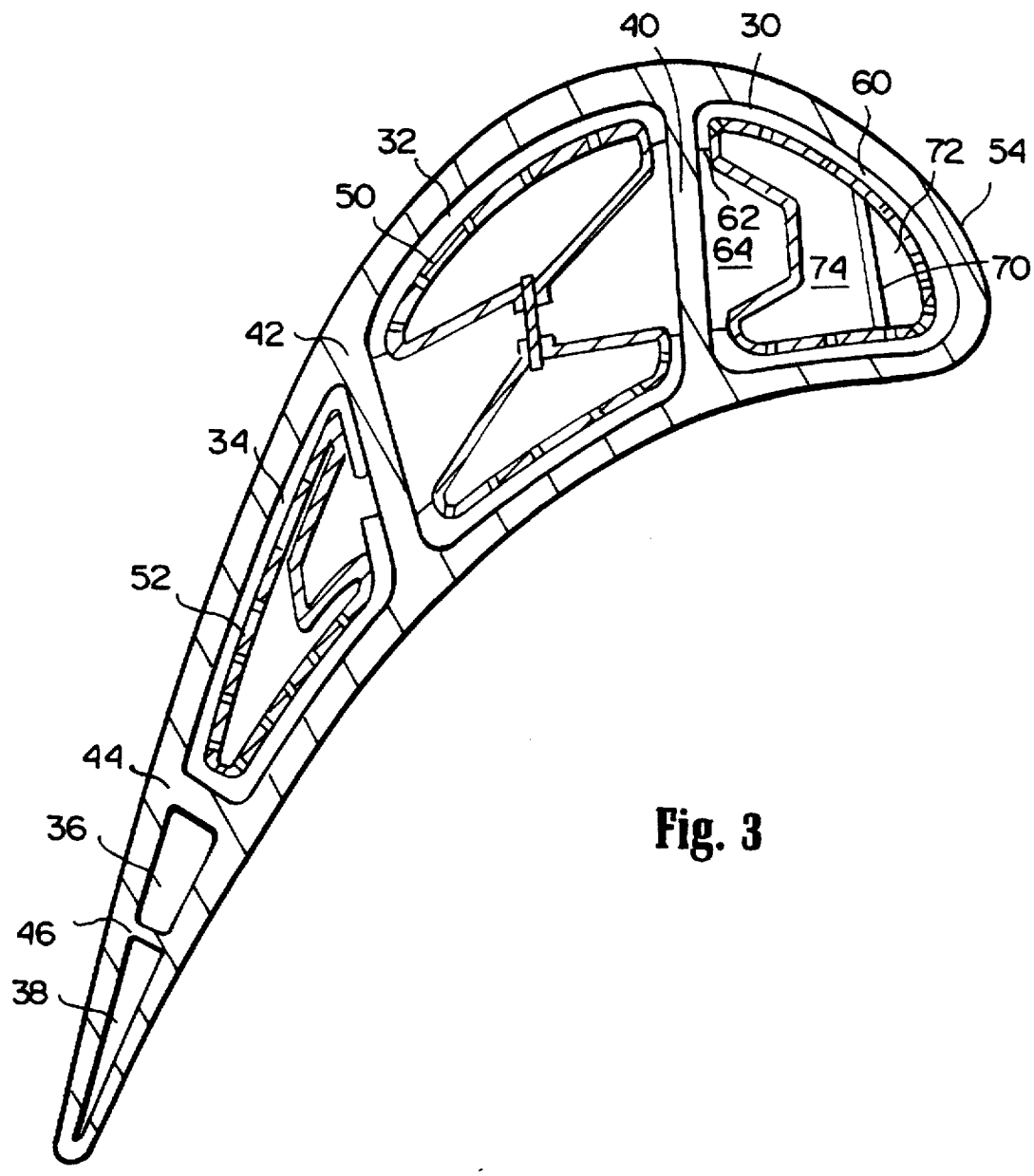
FIG. 3 is an enlarged cross-sectional view illustrating the cavities within the vane.

As best illustrated with reference to FIGS. 2 and 3, the vane 10 extends between the outer and inner walls 12 and 14, respectively, and has a plurality of cavities 30, 32, 34, 36 and 38 extending generally radially between outer and inner walls 12 and 14, respectively, and which cavities are defined in part by transversely extending divider walls 40, 42, 44 and 46. Thus, each cavity forms a discrete passage between the outer and inner walls 12 and 14, respectively. As will be appreciated from a review of co-pending application Ser. No. 414,697, the last two cavities adjacent the trailing edge, i.e., cavities 36 and 38, are employed for air cooling and suitable air circuits for supplying cooling air to those cavities and openings for communicating the spent cooling air into the hot gas stream flowing about the vane are provided as described in the above-referenced co-pending application. The intermediate cavities 32 and 34 have inserts 50 and 52 similarly as in the above-identified patent application and through which cooling medium, e.g., steam, is provided for impingement cooling of the adjacent side walls of the vane 10. Reference is made to the co-pending application for details of the steam cooling circuits and cooling afforded by those cavities and inserts. The present invention relates primarily to the cavity 30 and the cooling of the leading edge 54 of the vane 10, although the cooling scheme described herein is applicable to cavities of the vane other than the leading edge cavity.

Cavity 30 has an insert 56 which extends substantially the length of the cavity and has a plurality of impingement holes 58 along its forward and side surfaces such that cooling medium supplied within the cavity may flow through the impingement holes 58 for impingement along the interior wall surfaces of the leading edge cavity 30. Within the cavity 30, there is provided at radially spaced locations along the vane a plurality of inwardly directed projections or ribs 60 which space the insert 56 from the interior wall surfaces of the vane defining cavity 30. The ribs 60 extend about the interior wall surfaces of the cavity and terminate at 62 adjacent the interior divider wall 40 between the cavities 30 and 32. Ribs 60 thus define with the insert and the interior wall surfaces radially spaced axially extending flowpaths. Additionally, the insert 56 is recessed along its rear side to define a channel 64 in communication with each of the channels defined by the ribs 60, enabling spent cooling fluid to flow along the flowpaths into the channel 64 for flow radially inwardly toward inner wall 14.

A divider or partition 70 is disposed within insert 56, dividing the insert 56 into first and second radially extending chambers 72 and 74, respectively. Divider 70 extends transversely such that the first chamber lies along the leading edge of the insert and the second chamber is defined in part by opposed lateral wall portions of the insert in opposition to the side walls of the vane. The chambers 72 and 74 may be closed at their radially innermost ends. At the radially outer end of insert 56, the upper end of the second chamber 74 is closed by a partition 75. The upper end of the first chamber 72, however, remains open and lies in communication with a plenum 76. The plenum 76, in turn, communicates with a discrete inlet 78 (FIG. 1) for supplying cooling medium from the cooling medium supply pipe 26 directly to the first chamber 72.

The second chamber 74 has a side opening 78 in communication with the second plenum 22 through an aperture 80 in the wall of the vane. Thus, it will be seen that spent impingement cooling medium from second plenum 22 flows via aperture 80 and second inlet 78 into the rear or second chamber 74 for flow in a radial inward direction and laterally through the impingement holes 58.

To cool the leading edge cavity 30, cooling medium, for example, steam, is supplied from the cooling medium supply pipe 26. A portion of the cooling medium from supply pipe 26 flows into the first plenum 20 and through the impingement holes 24 for impingement cooling of the outer wall 12 of the segment, as indicated by the plurality of arrows in FIG. 1. The spent cooling medium then flows to the second chamber 74 by way of aperture 80 and inlet opening 78 which form an inlet to chamber 74. Cooling medium is also supplied directly from supply pipe 26 to first inlet 78 and to the first chamber 72 by way of plenum 76. The cooling medium is thus supplied directly to the first chamber 72 from the common cooling medium supply source 26 at a high pressure. The pressure of the cooling medium supplied to the second chamber 74, however, is considerably lower than the pressure of the cooling medium supplied to first chamber 72 as a result of the pressure losses associated with the impingement holes 24, as well as other losses associated with flowing the cooling medium through the various paths to the second chamber 74. Because of this very substantial lower pressure, the sink pressure between the insert and the walls of the vane is substantially lower. Consequently, the cooling intensity is substantially enhanced by the higher pressure differential across the insert, which causes a higher momentum of the flow of cooling medium and a higher cooling rate.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator vane segment for forming part of a stage of a rotary machine, comprising:

inner and outer walls spaced from one another;

a stator vane extending between said inner and outer walls and having forward, leading and aft trailing edges, said vane including a discrete cavity between the leading and trailing edges and extending lengthwise of said vane adjacent the forward leading edge thereof, interior wall surfaces of said vane in part defining said cavity;

an insert sleeve within said cavity for receiving a cooling medium and spaced from said interior wall surfaces of said vane;

said sleeve having a plurality of holes therealong for flowing the cooling medium through said sleeve holes into the space between said sleeve and said interior wall surfaces for impingement cooling of said vane along said leading edge thereof;

said sleeve having a divider extending at least a portion of the length of said insert and dividing the sleeve into first and second chambers;

said insert having first and second inlets to said first and second chambers, respectively, for supplying the cooling medium to said chambers at different pressures.

2. A stator vane segment according to claim 1 including a source of cooling medium common to said first and second inlets and a pair of discrete passages for conveying cooling medium from said common source to said first and second inlets respectively.

3. A stator vane segment according to claim 1 wherein said first chamber is located to provide impingement cooling along the leading edge of said vane and said second chamber is located to provide impingement cooling along opposite sides of said vane.

4. A stator vane segment according to claim 1 including a source of cooling medium common to said first and second inlets, first and second discrete passages for conveying cooling medium from said source to said first and second inlets, respectively, said second passage extending along said outer wall to cool said outer wall such that the cooling medium flowing into said second chamber through said second inlet is at a pressure reduced from the pressure of the cooling medium flowing through said first inlet into said first chamber.

5. A stator vane segment according to claim 4 wherein said second passage is defined in part by said outer wall and an outer wall cover spaced from said outer wall, and an impingement plate between said cover and said outer wall defining outer and inner plenums on opposite sides of said impingement plate, said impingement plate having openings enabling passage of the cooling medium from said outer plenum through said impingement plate openings and into said inner plenum for impingement cooling of said outer wall, said outer plenum lying in communication with said second inlet for supplying cooling medium to said second chamber at reduced pressure in comparison with the pressure of the cooling medium supplied the first chamber from said source.

6. A stator vane segment according to claim 1 wherein said insert sleeve and said interior wall surfaces of said vane define a flowpath therebetween for receiving the cooling medium from said first and second chambers through said plurality of openings, said flowpath extending from the leading edge of the vane and along opposite sides thereof for directing spent impingement cooling medium in a direction generally toward said trailing edge.

7. A stator vane segment according to claim 1 including a source of cooling medium common to said first and second inlets and a pair of discrete passages for conveying cooling medium from said common source to said first and second inlets, respectively, said first chamber being located to provide impingement cooling along the leading edge of said vane and said second chamber being located to provide impingement cooling along opposite sides of said vane whereby the pressure in the space between the interior wall surfaces and said sleeve is controlled by the pressure of the cooling medium supplied said second chamber enabling a substantial pressure difference across said insert for intensified impingement cooling.

8. A method of impingement cooling a leading edge portion of a vane forming part of a stator vane segment of a stage of a turbine wherein the vane extends between inner and outer walls of the segment and has a discrete cavity between the leading and trailing edges and extending lengthwise of the vane adjacent the forward leading edge thereof, comprising the steps of:

disposing an insert sleeve having impingement cooling holes within said cavity and spaced from interior wall surfaces of the vane;

dividing the sleeve into first and second chambers extending generally lengthwise of said sleeve and said cavity; and flowing cooling medium at different pressures into said first and second chambers, respectively, with the pressure of the cooling medium in said second chamber being lower than the pressure of the cooling medium in said first chamber whereby the pressure in the space between the interior wall surfaces and said sleeve is controlled by the pressure of the cooling medium supplied said second chamber, enabling a substantial pressure difference across said insert for intensified impingement cooling.

9. A method of impingement according to claim 8 including disposing the insert in said vane with said first chamber intermediate said leading edge of said vane and said second chamber.

10. A method of impingement according to claim 8 including providing a source of cooling medium common to said first and second chambers and a first and second passage for conveying cooling medium from said source to said first and second chambers, respectively, and including cooling said outer wall with cooling medium flowing from said source through said second passage prior to flowing into said second chamber.

11. A method of impingement according to claim 10 including impingement cooling said outer wall with the cooling medium flowing through said second passage.

* * * * *